United States Patent Office.

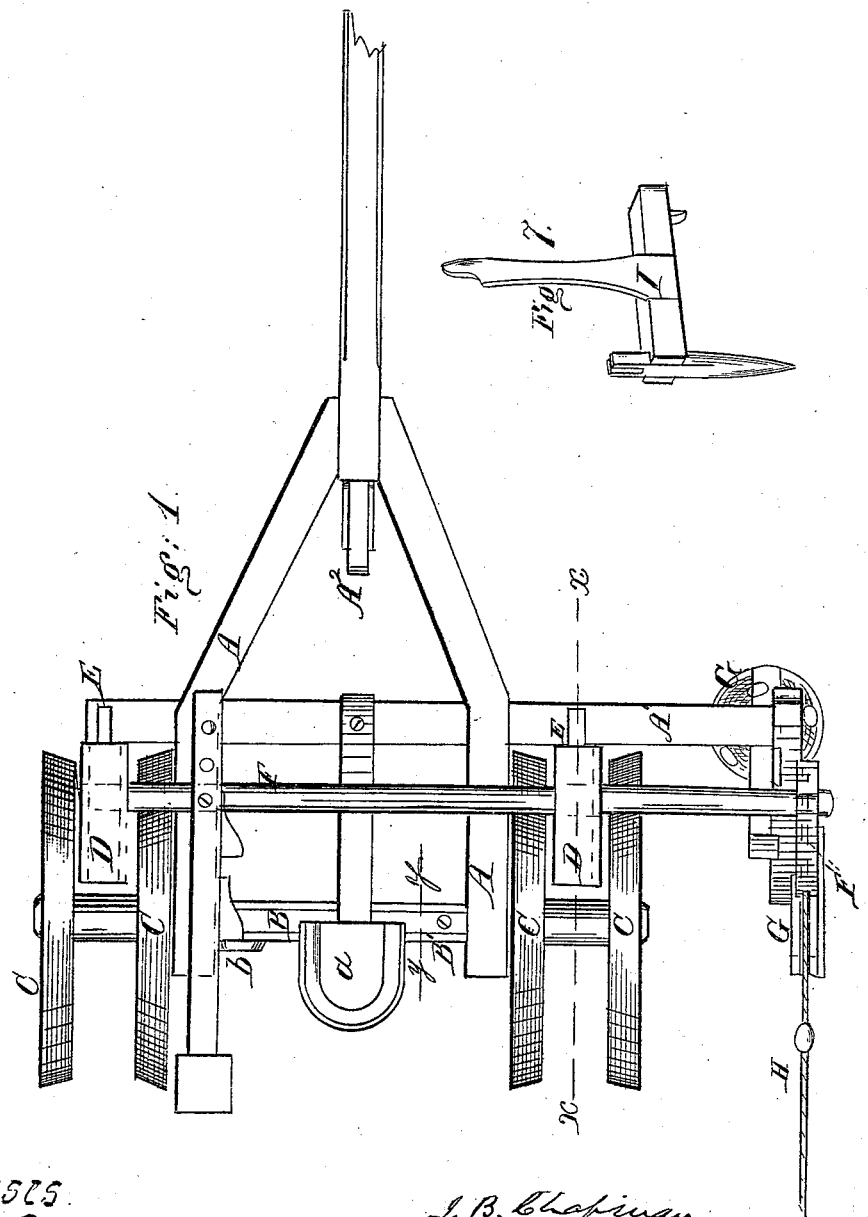

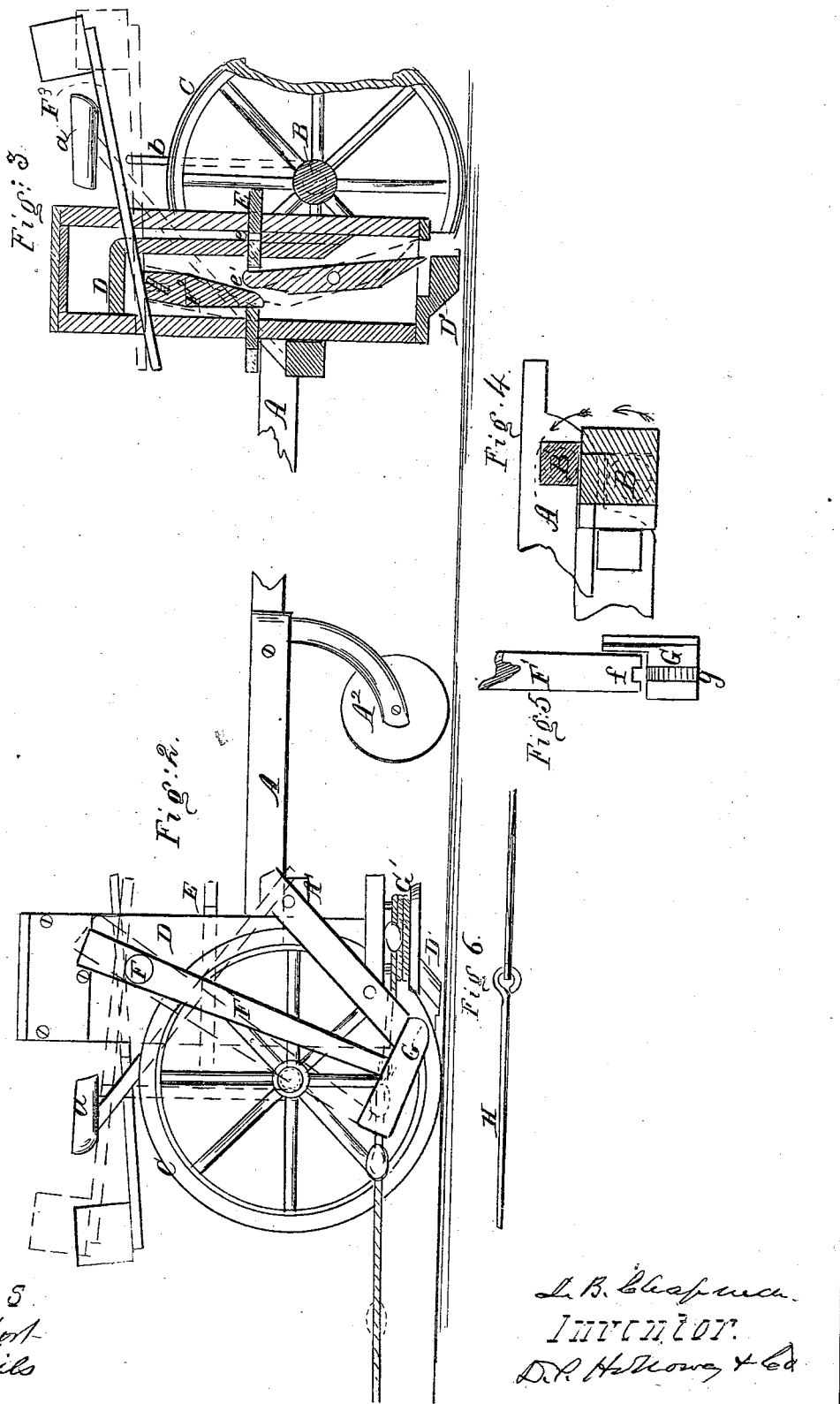

J. BURCHARD CHAPMAN, OF MORRISON, ILLINOIS.

Letters Patent No. 94,077, dated August 24, 1869.

---

IMPROVEMENT IN CORN-PLANTERS.

---

The Schedule referred to in these Letters Patent and making part of the same.

---

*To all whom it may concern:*

Be it known that I, J. BURCHARD CHAPMAN, of Morrison, in the county of Whiteside, and State of Illinois, have invented new and useful Improvements in Corn-Planters; and I do hereby declare that the following is a full, clear, and exact description thereof, reference being had to the accompanying drawings, making part of this specification, in which—

Figure 1 is a plan or top view of my improved machine.

Figure 2 is a side view of the same.

Figure 3 is a sectional elevation on line $xx$ of fig. 1.

Figure 4 is a section on line $yy$ of fig. 1, showing portion of the frame in its lowest position in red outlines.

Figure 5 is a rear-end view of the shoe through which the rope or chain passes which opens the seed-box, to admit of the corn or other seeds passing therefrom.

Figure 6 is a view of a section of a chain which may be used for operating the seed-slide, instead of the rope shown in figs. 1 and 2.

Figure 7 is a perspective view of a stake, by means of which the rope or chain is to be secured.

My invention relates to corn-planters; and

My improvements consist in the construction, combination, and arrangement of its several parts, as hereinafter more fully described.

To enable those skilled in the art to make and use my invention, I will proceed to describe its construction and operation.

A A, in the drawings, represent the frame of the machine, which may be constructed as shown, or in any manner which may be found to be the best adapted to the purpose for which it is to be used. To the front end of it, the pole is to be attached, which is here provided with a swivel-wheel, $A^2$, of sufficient diameter to assist in supporting the machine.

$A^1$ is a cross-beam of the frame, secured to it just in front of the covering-wheels when they are in their most forward position, and to which the seed-boxes are to be secured. One end of this cross-beam extends some distance beyond the outer covering-wheel, and to this end the shoe G is to be secured.

A seat, $a$, for the operator, may be mounted on the frame, as shown, or in any other convenient manner.

B represents the axle, the journals of which rest in the hubs of the covering-wheels. To the upper side of its square portion, a shaft, B′, having its bearings in the rear end of the frame, is firmly secured. It will be seen, by reference to fig. 4 of the drawings, that as the axle is turned on its centre in the direction indicated by the dotted red line, the shaft B′ will be lowered, carrying with it the frame A, until it is in the position indicated by the red outlines, when the further movement of the axle is arrested by abutting against projecting lips of the frame. This movement is accomplished by means of the lever $b$, which is secured to the rear side of the axle, and extends upward a sufficient distance, so as to be within easy reach of the operator. By the above-described arrangement, the operator is enabled to lower the seed-boxes, which, as stated, are firmly secured to the frame, sufficiently that the coulters fastened to their bottoms will enter the earth, to make a furrow for the seed to fall into, and raise them above the surface of the ground, as circumstances may require.

C C C C represent the covering-wheels, which, at the same time, are the carrying-wheels of the machine. They revolve on the journals of the axle B, and are to be made of a suitable diameter. The faces of the rims of each set are bevelled, so as to converge toward each other, which construction will have the effect of pushing the earth thrown up by the coulters back into the furrow, and covering the seed as the machine is moved along.

D D represent the seed-boxes, which are secured to the cross-beam $A^1$ of the frame, one between each set of the covering-wheels. The bottom of each box is provided with a coulter, D′, instead of the ordinary shoe, for making a furrow, into which the seed is to be dropped, said boxes extending downward such a distance, that when in their most elevated position, the coulters are just above the ground. The interior arrangement of the seed-boxes is clearly shown in fig. 3, each being divided into two compartments, the upper one of which is for the reception of the seed, which drops, through a passage, on the seed-slide; and in the other one, the lever operating the seed-slide and the dropper are placed. The lower bottom is provided with a suitable aperture, in rear of the coulter, through which the seed may fall into the furrow.

E E represent the seed-slides, which work in slots in the sides of the seed-boxes, under the passage of the same. Each has, in the proper place, a hole, $e$, made in it, of the required size, which, when brought under the passage of the seed-box, will be filled with seed, which drops, as the slide is drawn outward, on the dropper E′. This dropper is pivoted in the lower portion of the seed-box, partitioning, but working freely in the same, and is simply a lever, one arm of which extends upward through a slot, $e'$, in the seed-slide, while the other extends downward to near the bottom of the box, being pivoted so, relatively to the seed-slide, that as the cup $e$ in the latter is being filled with seed, its lower arm is in the position indicated by the black outlines in fig. 3, permitting any seed which may previously have been dropped on it to fall through the aperture in the bottom of the box, and into the furrow; and assuming the position indicated by the red outlines when the slide is drawn out, so that the seed may fall on it, and be held in the box until it is again operated upon.

F represents a rock-shaft, having its bearings in the sides of the seed-boxes some distance above the seed-slides, so as to give sufficient leverage to the levers $F^2$, extending from it downward through the slots $e'$ in the slides, and by which the latter as well as the droppers are operated. One end of this shaft extends such distance beyond the seed-box that the lever $F^1$, which is firmly secured to the end of it, and extends downward at a right-angle to it, will be in line with the shoe G, soon to be described. The extreme end of this lever $F^1$ is provided with a notch, $f$.

$F^3$ represents a lever or arm, one end of which is firmly secured to the shaft F, at any convenient place, and carrying, at its other end, a weight sufficiently heavy to return the shaft to its normal position after it has been operated upon.

G represents a shoe, which is firmly secured to the end of the cross-beam A by means of a connecting-timber, being high enough above the ground in its lowest position to go clear of any unevenness in the surface of the same. Its outer face has an upward-projecting flange, for the purpose of preventing the rope or chain, which is to slide in the groove $g$, on its upper surface, from slipping off. From the timber which connects this shoe with the cross-beam $A^1$, extends an arm, in a horizontal direction, and forward of the shoe, to which a stud is secured, on which a roller or pulley, $G'$, of suitable diameter, revolves horizontally, for the purpose of guiding the chain, when this is used, or on which the rope may be wound, when this is preferred as a means of operating the lever $F^1$. The extreme end of this lever comes down to just above the upper surface of the shoe, the latter being placed at such an angle that the distance between them is not increased as the lever is made to oscillate to the rear until it is carried beyond the shoe.

H represents a chain, which is to be of sufficient length to reach across the field in which corn or other seed is to be planted, and have some to spare, its links being about equal in length to the usual distance between each hill of corn. It is to be stretched across the field, passing through the groove $g$ in the shoe, and corresponding notch $f$ in the end of lever $F^1$, and over the pulley $G'$. If the machine be now drawn along the chain, the eyes of its links will cause the lever $F^1$ to oscillate to the rear, and drop the seed at regular intervals, the lever being returned to its normal position by the counterweight the moment the eyes of the links escape from it. If preferred, a rope, provided, at regular intervals, with round balls, to serve the purpose of the eyes of the chain, may be used, said rope to be stretched across the field the same as the chain, or it may be wound on the pulley, one end of it being secured at the point of starting, and paid out as the machine moves along. By employing a chain or rope, as above described, the seed can be planted more regularly than is usually done now, and it saves the labor of marking off the field before planting.

I represents a stake, of the construction clearly shown in fig. 7 of the drawings, which I propose to employ in securing the chain or rope at the ends of the rows, and by means of which the operator is enabled to shift the chain or rope when he arrives at one end thereof, so as to plant both ways. This is done in the following manner:

The chain or rope, having been stretched across the field, is passed through the notch in the stake I, which has previously been driven into the ground at the point of starting, in rear of the shoe of the machine, and is then carried along, at a right angle thereto, some distance, when it is again secured to the ground by a common stake. The end of a line is now tied, or secured in any other convenient manner, to the extreme end of the purchase on stake I, and, such line being carried on the machine, paid out, as the latter is moved along the chain, until the other end has been reached. In order to shift the chain now, the stake I, at the further end, is pulled up by means of the line, when the chain can be stretched across the field from the point where it is secured by the common stake at the other end, being such distance from the rows just planted, that in returning, two more rows are planted the proper distance from the former. Before returning on the new line, the chain at this end of the rows is arranged in the manner above described, so that on reaching the other end, it can be again shifted. Thus the operation is continued.

Having thus described my invention,

What I claim, and desire to secure by Letters Patent, is—

1. The combination of the axle B with the shaft $B'$, being arranged, with reference to the frame and seed-boxes, so as to operate substantially as shown and described.

2. The combination, in a seed-box, of the seed-slide E with the dropper $E'$, substantially as and for the purpose set forth.

3. The combination of the rock-shaft F, having the levers $F^1$ and $F^2$, with the seed-slides E and droppers $E'$, substantially as shown and described.

4. The combination of the rock-shaft F and lever $F^3$, having a counterweight, substantially as and for the purpose set forth.

5. The combination of the shoe G with the lever $F^1$, of the rock-shaft F, and the chain H, or its equivalent, arranged to operate substantially as shown and described.

6. The stake I, constructed substantially as shown and described.

In testimony whereof, I have signed my name to this specification, in the presence of two subscribing witnesses.

J. BURCHARD CHAPMAN.

Witnesses:
 WM. E. SOUTHARD,
 J. B. ROBINSON.